I. B. NAYLOR.
IRRIGATION PIPE.
APPLICATION FILED FEB. 13, 1914.
1,152,901.
Patented Sept. 7, 1915.
2 SHEETS—SHEET 1.
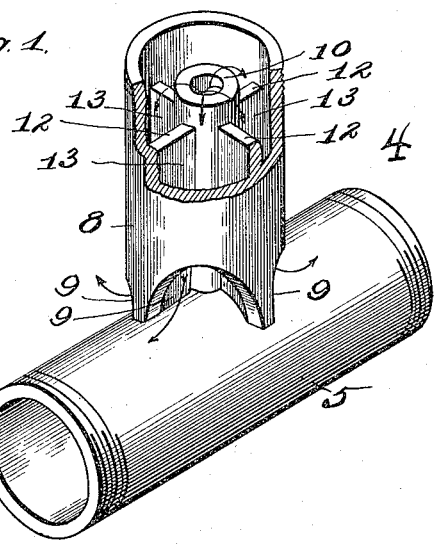
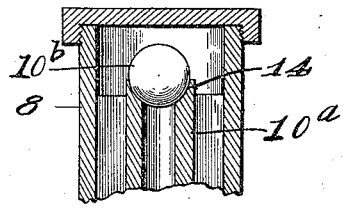
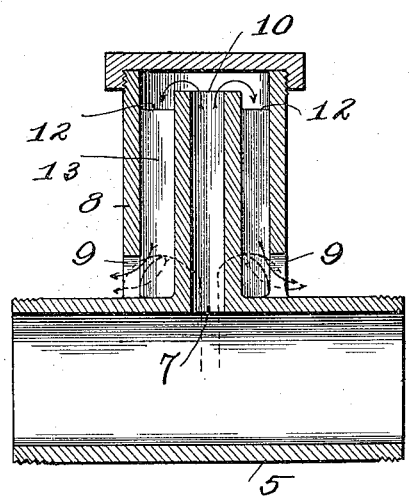
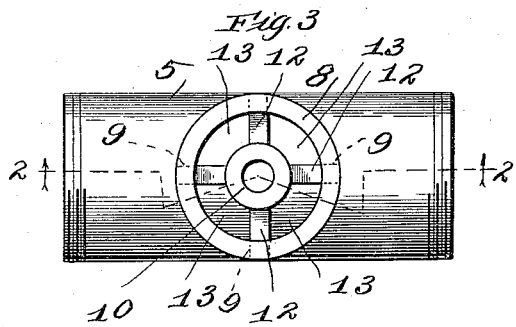
Witnesses
Inventor
Isaac B. Naylor
By Edwin S. Clarkson
his Attorney

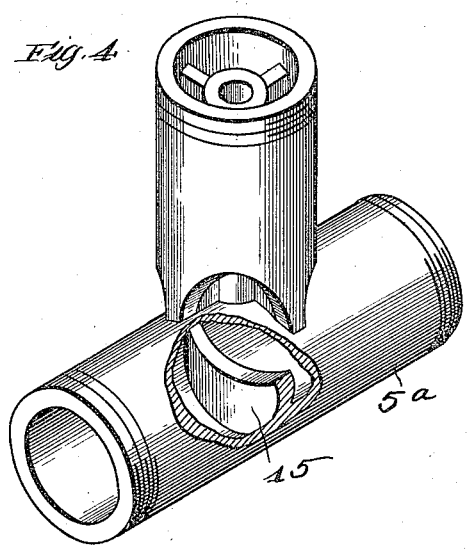
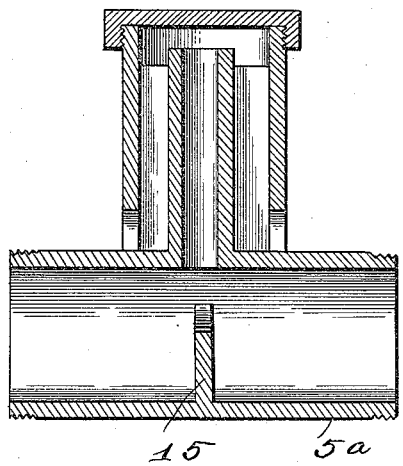
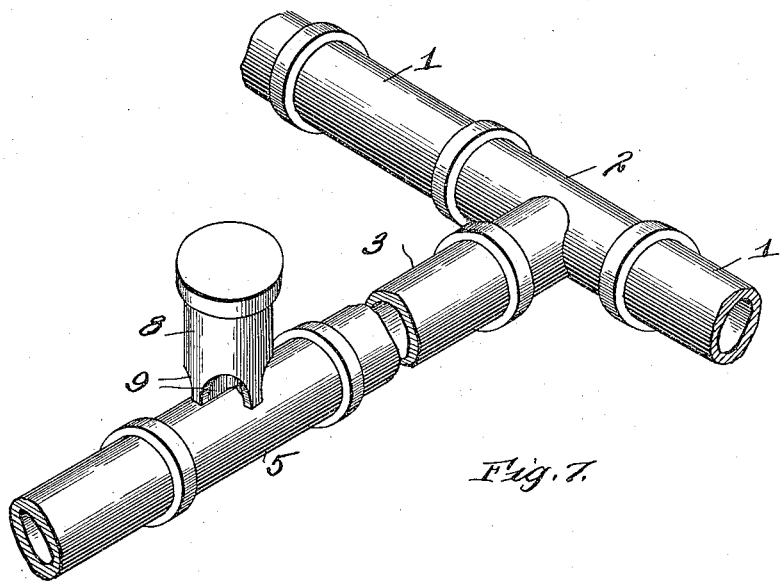

UNITED STATES PATENT OFFICE.

ISAAC B. NAYLOR, OF NEW YORK, N. Y.

IRRIGATION-PIPE.

1,152,901. Specification of Letters Patent. Patented Sept. 7, 1915.

Application filed February 13, 1914. Serial No. 818,487.

*To all whom it may concern:*

Be it known that I, ISAAC B. NAYLOR, a citizen of the United States, residing at New York, in the county of New York and State of New York, have invented certain new and useful Improvements in Irrigation-Pipes, of which the following is a specification.

In irrigating land, the pipes are carried different distances and outlets are provided at certain distances apart, either direct from the pipe or lateral pipes are tapped into the main conduit to carry water the desired distance from the main pipe, and in many instances the discharge of water is through unprotected perforations, slots or nozzles, which results in sand and other foreign substances being washed into the pipes when there is no discharge from the pipes, whereby the pipes become clogged and some times closed, thereby seriously interfering with irrigating the land.

The object of my invention is to provide an outlet for an irrigation pipe which is of a construction to prevent the entrance of sand and other foreign matter into the water pipe through the outlet.

A further object of my invention is to provide an improved outlet for irrigation systems where the water in the system is under pressure; and with these and minor objects in view, my invention consists of the parts and combination of parts as will be hereinafter pointed out.

In the drawings Figure 1 is a perspective view of a pipe unit embodying my invention; Fig. 2 is a longitudinal vertical section of the same; Fig. 3 is a top plan view of Fig. 1; Fig. 4 is a perspective view of a pipe unit showing another embodiment of my invention; Fig. 5 is a longitudinal vertical section of the same; Fig. 6 is a detail sectional view showing a modification; and Fig. 7 is a diagrammatic perspective view of a portion of an irrigation system embodying my invention.

The reference numeral 1 designates a supply pipe of an irrigation system between the lengths of which are disposed suitable three-way or T-pipe units 2 of any approved type, by means of which the lateral irrigation pipes 3 are connected to the main supply pipe. At the end or at suitable intervals throughout the length of each of the laterals, I introduce by improved discharge unit 4. In manufacturing this discharge unit, I prefer to have the length of the main flow pipe 5 equal the height of the discharge nozzle 6, plus the diameter of the main flow pipe. The main flow pipe 5 of the discharge unit is provided with screw threads at each end, whereby it may be joined with a water-tight joint to the other sections of the pipe.

7 is a discharge port leading from the main flow pipe 5 to divert water therefrom. The discharge nozzle comprises a casing 8 having discharge ports 9 in its side walls at the base thereof, a pipe 10 centered in said casing and forming a continuation of the discharge port 7 in the main flow pipe 5. It will be noted that the top of the pipe 10 terminates short of the casing 8 in order that there may be an overflow or "spill" space between its top and the bottom face of the cap 11, said cap being screw-threaded to the upper end of the nozzle casing 8.

12 are partitions arranged in the space between the casing 8 and the pipe 10 dividing said space into four channels 13, at the bottom of each of which is one of the ports 9 in the casing. It will be noted, more clearly in Fig. 3, that the tops of the partitions 12 terminate short of the top of the nozzle pipe 10, which results in a better distribution of the water from the pipe 10 into the several channels 13. I may, if found desirable, form a ball seat 14 on the top of the pipe 10$^a$ and seat a ball 10$^b$ therein to serve as a valve, as shown in Fig. 6.

I may, if it is found desirable, form a baffle 15 in the pipe 5$^a$, disposed transversely of the pipe, as shown in Figs. 4 and 5, the object of which is to throttle the main passageway at a point in juxtaposition to each lateral port 7.

From the above description, it will be seen that sand and other foreign matter cannot enter the nozzle pipe, nor main flow pipe, and that if sand, etc., should accumulate around the ports 9, the weight of the column of water in the channels plus the velocity of the water will be sufficient to clear said ports 7 from all obstruction.

What I claim is:—

1. In an irrigation system, a discharge nozzle comprising a main flow pipe having a port therein, a casing extending from said pipe and surrounding said port, a discharge nozzle pipe connected to and leading from said port to a point short of the top of the casing, channels formed between the nozzle pipe and casing, and a port through said casing at the bottom of each channel, said ports being so disposed as to lead the water to opposite sides of the casing.

2. A discharge nozzle for an irrigation system comprising a main flow pipe having a discharge port, a casing surrounding said port and extending at right angles from said pipe, a cap for said casing, a nozzle pipe leading from said port and extending to a point short of the top of the casing, said nozzle pipe being concentric with the casing, partitions dividing the space between said casing and nozzle pipe into channels, and a port at the bottom of each channel, said ports being so disposed as to lead the water to opposite sides of the casing leading through the wall of the casing.

3. A discharge nozzle for an irrigation system comprising a main flow pipe having a discharge port, a casing surrounding said port and extending at right angles from said pipe, a nozzle pipe within said casing and leading from the said port to a point short of the top of the casing, said nozzle pipe and casing being spaced from each other, partitions dividing the space between the casing and nozzle pipe into channels, a port at the bottom of each channel leading through the wall of the casing, said ports being so disposed as to lead the water to opposite sides of the casing, said partitions terminating short of the top of the nozzle pipe.

In testimony whereof I affix my signature in presence of two witnesses.

ISAAC B. NAYLOR.

Witnesses:
EDWIN S. CLARKSON,
BENNETT S. JONES.

Copies of this patent may be obtained for five cents each, by addressing the "Commissioner of Patents, Washington, D. C."